United States Patent
Saito et al.

(10) Patent No.: US 8,316,879 B2
(45) Date of Patent: Nov. 27, 2012

(54) METHOD AND DEVICE FOR CONTROLLING PRESSURE OF VACUUM CONTAINER

(75) Inventors: Hideki Saito, Osaka (JP); Toshiro Saeki, Osaka (JP)

(73) Assignee: Hitachi Zosen Corporation (JP)

( * ) Notice: Subject to any disclaimer, the term of this patent is extended or adjusted under 35 U.S.C. 154(b) by 329 days.

(21) Appl. No.: 12/745,994

(22) PCT Filed: Nov. 19, 2008

(86) PCT No.: PCT/JP2008/003374
§ 371 (c)(1),
(2), (4) Date: Jun. 3, 2010

(87) PCT Pub. No.: WO2009/072241
PCT Pub. Date: Jun. 11, 2009

(65) Prior Publication Data
US 2010/0252121 A1    Oct. 7, 2010

(30) Foreign Application Priority Data
Dec. 5, 2007 (JP) .................. 2007-314095

(51) Int. Cl.
*F16K 31/02* (2006.01)
(52) U.S. Cl. .................. 137/487.5; 700/282; 702/47
(58) Field of Classification Search ............... 137/487.5; 700/282; 702/45, 47
See application file for complete search history.

(56) References Cited

U.S. PATENT DOCUMENTS

| | | | | |
|---|---|---|---|---|
| 3,794,070 A | * | 2/1974 | Klem et al. | 137/487.5 |
| 6,022,483 A | | 2/2000 | Aral | 216/59 |
| 6,142,163 A | * | 11/2000 | McMillin et al. | 137/14 |
| 6,152,168 A | * | 11/2000 | Ohmi et al. | 137/487.5 |
| 6,612,331 B2 | * | 9/2003 | Cederstav et al. | 137/487.5 |
| 7,204,155 B2 | * | 4/2007 | Lane et al. | 73/861 |
| 7,437,944 B2 | * | 10/2008 | Melcer et al. | 73/861 |
| 2002/0117212 A1 | | 8/2002 | Vyers et al. | 137/487.5 |
| 2004/0159354 A1 | * | 8/2004 | Cederstav et al. | 137/487.5 |
| 2007/0021850 A1 | | 1/2007 | Wojsznis et al. | 700/42 |

FOREIGN PATENT DOCUMENTS

| | | |
|---|---|---|
| EP | 1 306 737 A2 | 5/2003 |
| JP | 62-047719 | 3/1987 |
| JP | 01-111213 | 4/1989 |
| JP | 2002-091573 | 3/2002 |

OTHER PUBLICATIONS

Supplementary European Search Report from corresponding European Patent Application No. 08856908.2, dated Sep. 2, 2011, 2 pages.
Int'l Search Report from corresponding Int'l Patent Application No. PCT/JP2008/003374, 1 Page.

* cited by examiner

*Primary Examiner* — William McCalister
(74) *Attorney, Agent, or Firm* — Kusner & Jaffe (57) ABSTRACT

A method in which a pressure in an imaginary vacuum container is determined by calculation based on a gas flow rate difference between an estimated discharge gas amount determined from the actual opening degree of a vacuum valve provided on the discharge conduit of a vacuum container and an estimated inflow gas amount determined in the preceding operation period, an estimated inflow gas amount at the present time is determined based on a difference between the calculated pressure and a pressure measured in an actual vacuum container by a pressure meter, a set discharge gas amount is determined by adding, to the estimated inflow gas amount, a correction gas amount obtained based on a pressure deviation between a set pressure and the measured pressure, and the degree of opening of the vacuum valve is controlled such that a discharge gas amount reaches the set discharge gas amount.

2 Claims, 7 Drawing Sheets

METHOD AND DEVICE FOR CONTROLLING PRESSURE OF VACUUM CONTAINER

TECHNICAL FIELD

The present invention relates to a method and device for controlling the pressure of a vacuum container.

BACKGROUND ART

In the manufacturing of semiconductor elements and so on, treatment such as etching is performed on the surfaces of semiconductor wafers by supplying reactant gas into vacuum containers (that is, at a predetermined degree of vacuum). In order to improve quality, it is necessary to precisely control pressures in the vacuum containers.

In such semiconductor production equipment of the prior art, a massflow meter is provided on a gas supply tube for supplying gas into a vacuum container, and a variable conductance valve is provided on a gas discharge tube for discharging gas from the vacuum container. The valve is controlled such that a pressure from a pressure meter provided on the vacuum container reaches a target pressure (e.g., see Japanese Patent Laid-Open No. 62-47719).

DISCLOSURE OF THE INVENTION

Problem to be Solved by the Invention

In the pressure control of the prior art, feedback control is performed so as to set a pressure deviation at 0. The pressure control requires at least a proportional plus integral action, that is, PI control.

Particularly, the pressure control requires I control, that is, an integral action, so that it is necessary to adjust resetting conditions (e.g., the conditions for changing the timing of control according to a deviation) when a set pressure is changed, resulting in a complicated control structure.

An object of the present invention is to provide a method and device for controlling the pressure of a vacuum container which can simplify a control structure for controlling the pressure of the vacuum container.

Means for Solving the Problem

In order to solve the problem, a method for controlling the pressure of a vacuum container according to a first aspect of the present invention is a pressure control method for controlling the pressure of the vacuum container in a vacuum processing device including: the vacuum container to which a gas supply conduit and a discharge conduit are connected; a vacuum valve provided on the discharge conduit so as to open and close the discharge conduit; a pressure meter for measuring the pressure in the vacuum container; and an opening degree detector for detecting the degree of opening of the vacuum valve, the pressure control method including: a first step of determining by calculation a pressure in an imaginary vacuum container on a calculation model based on a gas amount obtained in consideration of an estimated discharge gas amount determined based on the degree of opening of the vacuum valve, the degree of opening being detected by the opening degree detector;

a second step of determining an estimated inflow gas amount based on a pressure difference between the calculated pressure determined in the first step and a pressure measured in an actual vacuum container by the pressure meter; and a third step of determining a set discharge gas amount by adding, to the estimated inflow gas amount determined in the second step, a correction gas amount obtained based on a pressure deviation between a target set pressure and the measured pressure, wherein the steps are repeatedly performed in each predetermined period, the degree of opening of the vacuum valve is controlled such that a discharge gas amount reaches the set discharge gas amount determined in the third step, and the gas amount used for determining the calculated pressure in the imaginary vacuum container in the first step is a gas flow rate difference obtained by subtracting the estimated discharge gas amount from the estimated inflow gas amount.

A pressure controller of a vacuum container according to a second aspect is a pressure controller for controlling the pressure of a vacuum container in a vacuum processing device including: the vacuum container to which a gas supply conduit and a discharge conduit are connected; a vacuum valve provided on the discharge conduit so as to open and close the discharge conduit; a pressure meter for measuring the pressure in the vacuum container; and an opening degree detector for detecting the degree of opening of the vacuum valve, the pressure controller including:

a pressure setting section for setting the target pressure of the vacuum container;

an inflow gas amount estimating section that determines a pressure in an imaginary vacuum container on a calculation model based on a gas amount obtained in consideration of an estimated discharge gas amount determined according to the degree of opening detected by the opening degree detector, and determines an estimated inflow gas amount based on a pressure difference between the calculated pressure in the imaginary vacuum container and a pressure measured in an actual vacuum container by the pressure meter;

a gas amount correcting section having a pressure subtracting section that receives the set pressure from the pressure setting section and the measured pressure from the pressure meter to determine a pressure deviation, and a proportional control section that receives the pressure deviation determined in the pressure subtracting section and multiplies the pressure deviation by a predetermined gain to obtain a correction gas amount;

an adding section that adds the estimated inflow gas amount determined in the inflow gas amount estimating section and the correction gas amount determined in the gas amount correcting section to determine a set discharge gas amount; and a valve opening degree calculating section that receives the set discharge gas amount obtained in the adding section and the set pressure from the pressure setting section to determine a valve opening degree, wherein in the inflow gas amount estimating section, the pressure in the imaginary vacuum container on the calculation model is determined based on the gas amount and an operation for determining the estimated inflow gas amount is performed in each predetermined period based on the pressure difference between the calculated pressure in the imaginary vacuum container and the pressure measured in the actual vacuum container by the pressure meter, and in the inflow gas amount estimating section, the gas amount used for determining the calculated pressure in the imaginary vacuum container is a gas flow rate difference obtained by subtracting the estimated discharge gas amount from the estimated inflow gas amount.

The pressure controller of the vacuum container according to a third aspect, wherein the inflow gas amount estimating section of the pressure controller according to the second aspect includes:

a conductance obtaining section that determines the conductance of the vacuum valve from the detected degree of opening and based on the valve opening degree-conductance characteristic curve of the vacuum valve;

a multiplying section that receives the conductance obtained in the conductance obtaining section and the measured pressure from the pressure meter and multiplies the conductance by the measured pressure to obtain the estimated discharge gas amount;

a gas amount subtracting section that subtracts the estimated discharge gas amount determined in the multiplying section from the estimated inflow gas amount to obtain the gas flow rate difference;

a pressure calculating section that receives the gas flow rate difference determined in the gas amount subtracting section and determines the pressure in the imaginary vacuum container by calculation;

a pressure subtracting section that receives the calculated pressure determined in the pressure calculating section and the measured pressure from the pressure meter to determine the pressure difference; and an amplifying section that multiplies the pressure difference determined in the pressure subtracting section by the predetermined gain to determine the estimated inflow gas amount.

Advantage of the Invention

According to the pressure control method and the pressure controller, an estimated inflow gas amount is determined based on a pressure difference between the calculated pressure of a vacuum container and a measured pressure from a pressure meter, the calculated pressure being determined according to a gas flow rate difference between an estimated discharge gas amount obtained from the degree of opening of a vacuum valve and an estimated inflow gas amount. Further, a correction gas amount determined using the pressure deviation of the measured pressure from the set pressure is added to the estimated inflow gas amount to determine a set discharge gas amount, and the valve opening degree is controlled to discharge gas to the set discharge gas amount, so that only proportional control is necessary in feedback control on a pressure. Therefore, it is not necessary to adjust resetting conditions and so on in proportional plus integral control, thereby simplifying a control structure.

In other words, in feedback control for tracking the set pressure to obtain the set discharge gas amount, PID control or at least PI control is necessary in the prior art, whereas in the present invention, the estimated inflow gas amount is obtained in response to an integral action (I control) on a pressure deviation and thus only proportional control is necessary.

BEST MODE FOR CARRYING OUT THE INVENTION

Referring to FIGS. 1 to 10, the following will describe a method and device for controlling the pressure of a vacuum container according to an embodiment of the present invention.

For example, the vacuum container of the present embodiment is used for manufacturing semiconductor elements. To be specific, the vacuum container is used for performing predetermined surface treatment on a semiconductor wafer to be processed, with reactant gas (an example of gas) supplied in a state in which plasma or the like is generated at a predetermined degree of vacuum.

First, the following will describe the basic concept of pressure control in the vacuum container according to the present invention.

A pressure in the vacuum container depends upon a difference between an amount of inflow gas (hereinafter will be called an inflow gas amount or a gas supply amount) and an amount of outflow gas (may be called an outflow gas amount but hereinafter will be called a discharge gas amount). Thus in order to keep a pressure at a constant value (or a predetermined value), the discharge gas amount is preferably controlled to the inflow gas amount.

In other words, it is preferable that the inflow gas amount is measured and the same amount of gas is discharged as the measured inflow gas amount. However, a reaction of gas flowing into plasma generates additional gas in the vacuum container, so that a measured value is far from an actual inflow gas amount. For this reason, without using the measured value, a pressure in a vacuum container on a calculation model (hereinafter, called an imaginary vacuum container) is calculated using a gas amount obtained based on a discharge gas amount (that is, in consideration of a discharge gas amount) estimated from the valve opening degree of a vacuum valve (will be described later), and an inflow gas amount is used that is an estimated value determined according to a difference between the pressure obtained by calculation (hereinafter, also called a calculated pressure) and a pressure actually measured in a vacuum container (hereinafter, also called an actual vacuum container).

Figure 1:
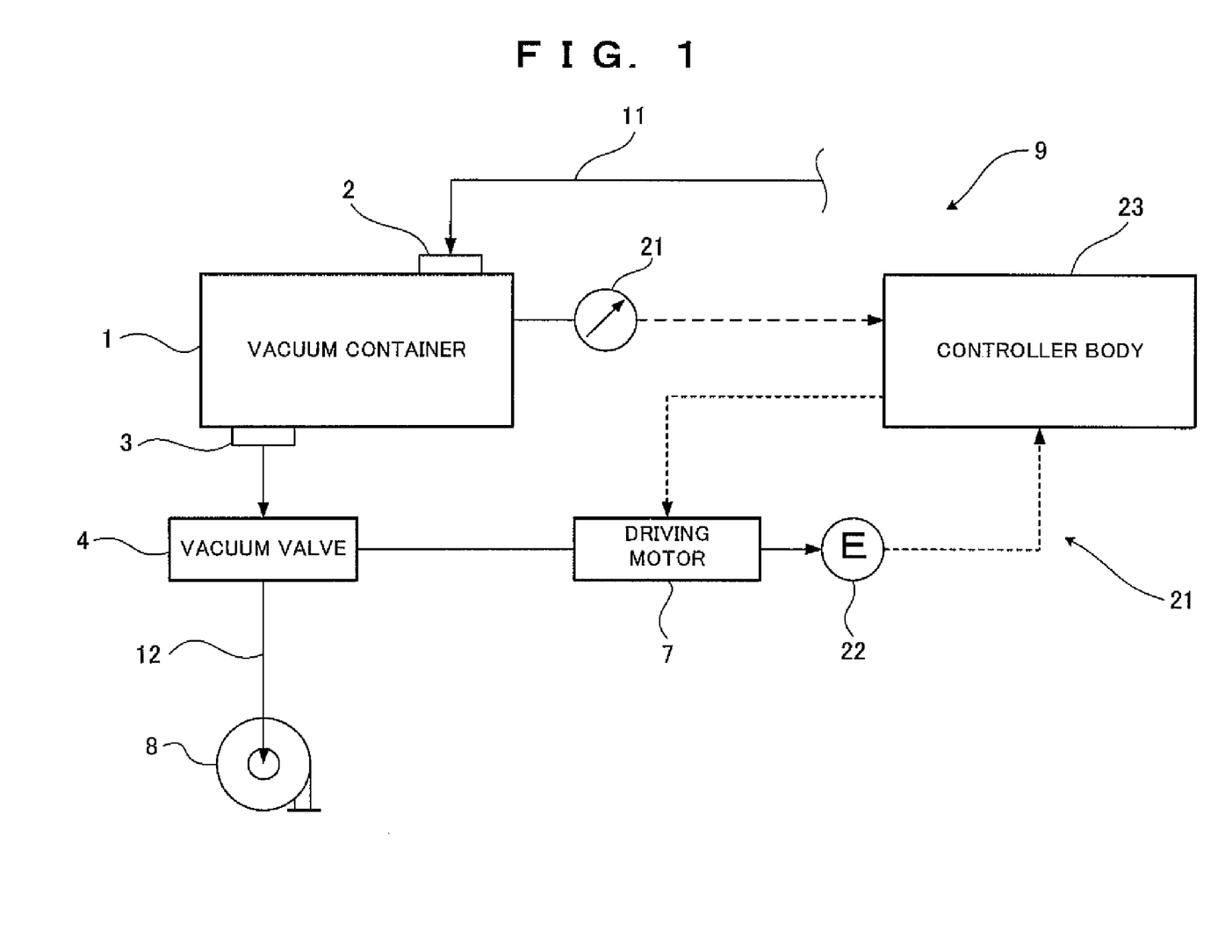
FIG. 1 is a schematic diagram showing the schematic configuration of a vacuum container and a pressure controller according to an embodiment of the present invention.
Figure 2:
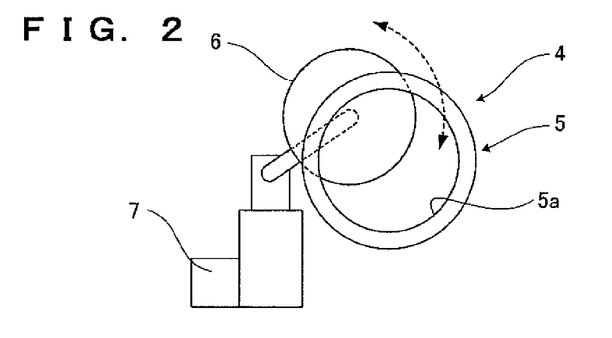
FIG. 2 is a plan view showing the principle part of a vacuum valve provided on the vacuum container.

Referring to FIGS. 1 and 2, first, the schematic overall configuration of a vacuum processing device will be described below.

The vacuum processing device is made up of a vacuum container 1 in which predetermined treatment (including etching) can be performed on, e.g., a supplied semiconductor wafer, the vacuum container 1 having a reactant gas supply port 2 and a gas discharge port 3; a gas supply tube (an example of a gas supply conduit) 11 that is connected to the supply port 2 and supplies reactant gas; a vacuum valve 4 that is connected to the discharge port 3 and is made up of a valve body 5 having a circular opening 5a (that is, a valve seat), a valve element 6 capable of opening and closing the opening 5a, and a driving motor (an example of a drive section, to be specific, a stepping motor) 7 for opening and closing the valve element 6; a gas discharge tube (an example of a gas discharge conduit) 12 having one end connected to the exhaust port of the vacuum valve 4 and the other end connected to a vacuum pump 8; and a pressure controller 9 for controlling a pressure in the vacuum container 1. The vacuum valve 4 is directly connected to the discharge port 3 in this explanation. As a matter of course, the vacuum valve 4 may be provided at some point of the gas discharge tube 12.

The pressure controller 9 is made up of a pressure meter (a single pressure meter is illustrated for the convenience of explanation, though multiple pressure meters may be provided when necessary) 21 for measuring a degree of vacuum, that is, a pressure in the vacuum container 1; an opening degree detector (to be specific, an encoder for detecting the rotation amount of the driving motor) 22 for detecting the degree of opening of the valve element 6 (hereinafter, also called a valve opening degree) of the vacuum valve 4; and a controller body 23 that receives the pressure measured in the pressure meter 21 and the valve opening degree (hereinafter, will be called an actual valve opening degree) detected in the opening degree detector 22 and controls the driving motor 7 of the vacuum valve 4 so as to set a pressure in the vacuum container 1 at a target value (hereinafter, will be called a set pressure).

The following will describe the operations of the valve element 6 of the vacuum valve 4.

Figure 3:
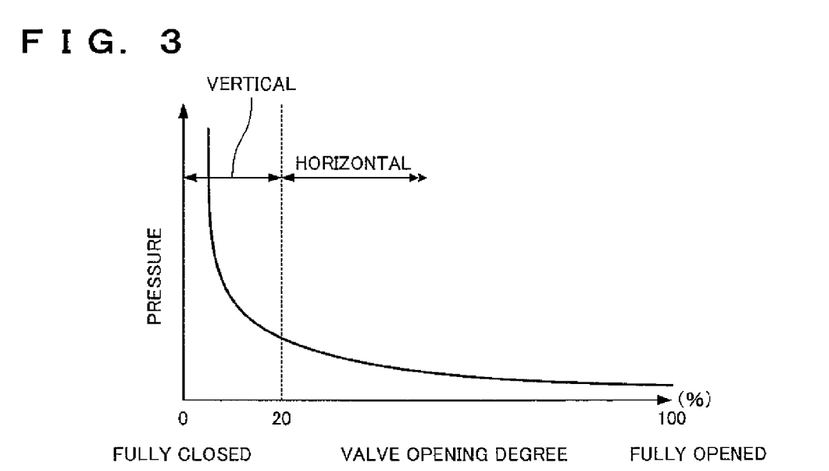
FIG. 3 is a graph showing the relationship between a valve opening degree and a pressure of the vacuum valve.

The vacuum valve 4 has a pressure control function and a vacuum sealing function (but is not limited to a vacuum valve having both of the functions). In other words, the amount of gas passing through the opening 5a can be controlled by sliding the valve element 6 of the vacuum valve 4 on the circular opening 5a. After the valve element 6 closes the opening 5a (in this case, the opening 5a is not sealed but is entirely covered with the valve element), the valve element 6 moves around (a so-called valve seat side) the opening 5a, that is, in the vertical direction, so that the opening 5a is completely closed (in a sealed state). FIG. 3 is a graph showing the general relationship between a valve opening degree of the vacuum valve 4 and a pressure controlled by the vacuum valve 4 on the controlled space side.

According to this graph, the valve element 6 having moved to a closing position (in this case, 20%) moves in the vertical direction (a so-called vertical movement) and thus completely seals the opening 5a. In other words, when the valve element 6 moves to the closing position, the pressure is increased by a certain degree and then is rapidly increased by the subsequent vertical movement (as a matter of course, the pressure rapidly decreases in the pressure control of the vacuum container). In short, there is a nonlinear relationship between a valve opening degree and a pressure in the vacuum valve 4.

In the present invention, a calculated pressure in the imaginary vacuum container is used for determining an estimated inflow gas amount. As previously mentioned, the calculated pressure is determined using a gas amount obtained based on an estimated discharge gas amount. Precisely speaking, the gas amount is a gas flow rate difference between an estimated discharge gas amount that is an estimated value determined from a valve opening degree and an estimated inflow gas amount determined based on a pressure difference between a calculated pressure in the imaginary vacuum container and a measured pressure in the actual vacuum container. Further, the estimated discharge gas amount is determined using the characteristic curve of the vacuum valve. The characteristic curve is used for compensating for the nonlinear relationship between a valve opening degree and a pressure.

Figure 4:
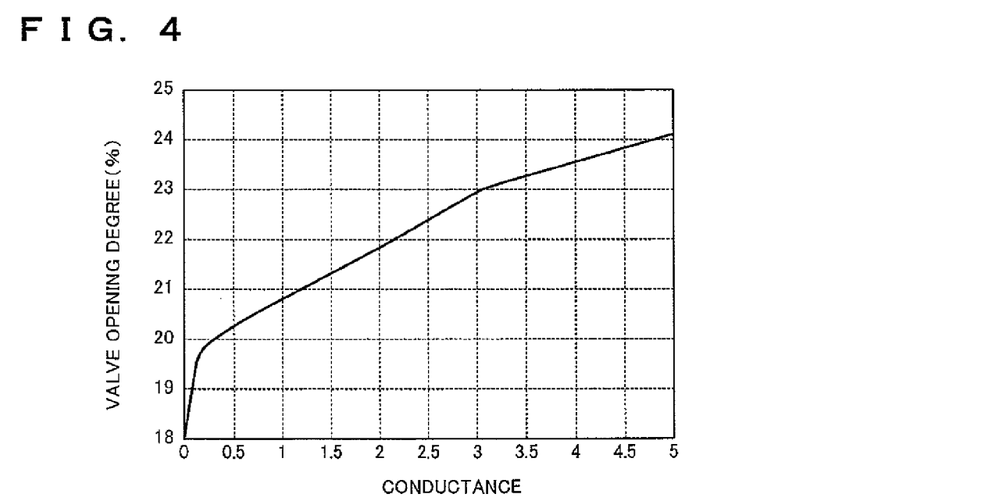
FIG. 4 is a graph showing the relationship between a valve opening degree of the vacuum valve and conductance.

As shown in FIG. 4, the characteristic curve of the valve indicates the relationship between a valve opening degree and a conductance. To be specific, the characteristic curve is stored as a numerical table in a storage and so on. A conductance indicates the ease of gas flow and is a value obtained by dividing a gas flow rate by a pressure (gas flow rate/pressure).

Figure 5:
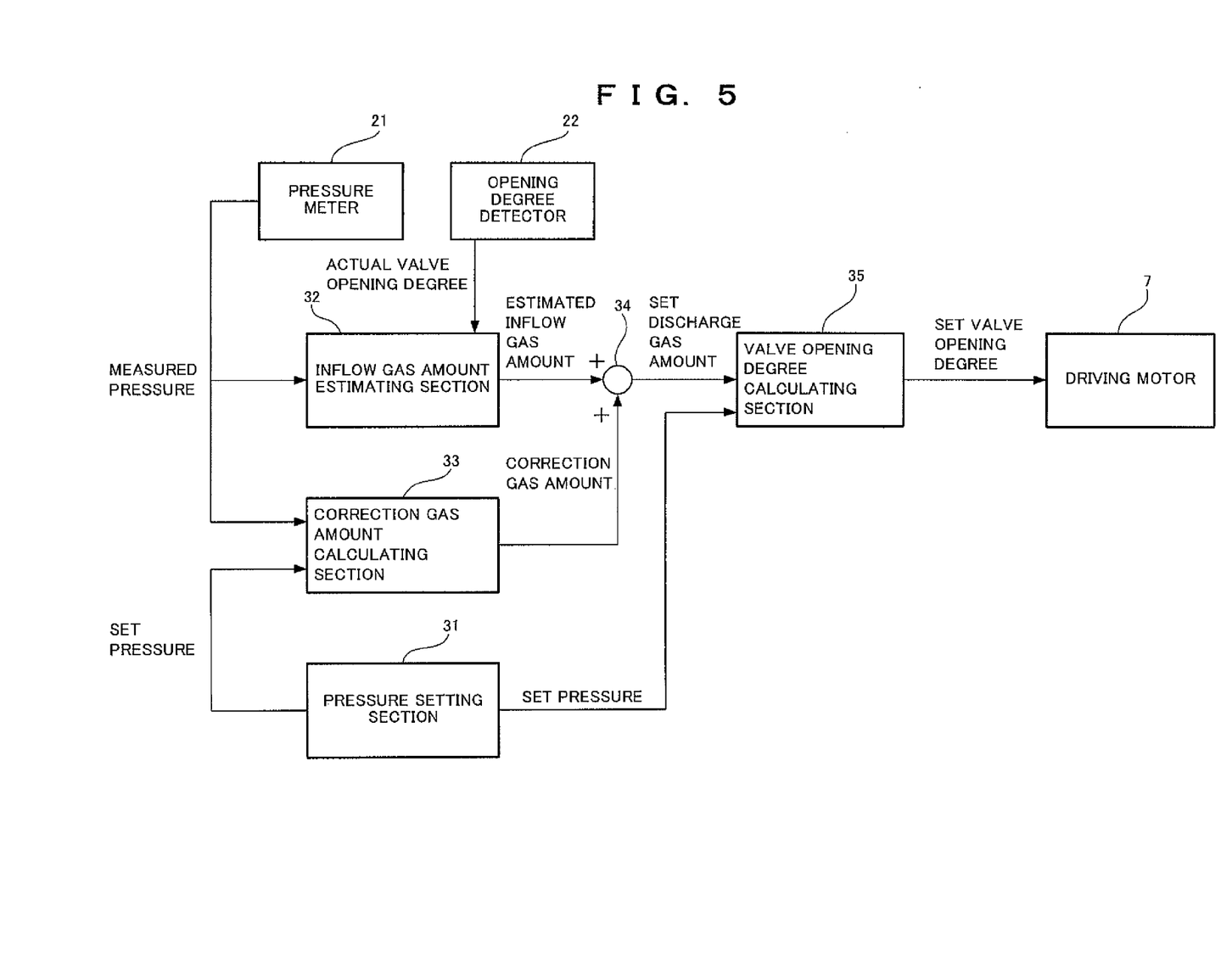
FIG. 5 is a block diagram showing the schematic configuration of the pressure controller.

Referring to FIG. 5, the configuration of the pressure controller 9 will be described below.

The pressure controller 9 is roughly made up of a pressure setting section 31 for setting a set pressure (also called a target pressure) that is the target of the vacuum container 1; an inflow gas amount estimating section 32 that determines by calculation a pressure in the imaginary vacuum container based on a gas flow rate difference between an estimated discharge gas amount determined from an actual valve opening degree having been detected by the opening degree detector 22 and a pressure having been measured by the pressure meter 21 and an estimated inflow gas amount, which will be described later, and determines an estimated inflow gas amount based on a pressure difference between the calculated pressure and the measured pressure; a correction gas amount calculating section 33 that receives the set pressure from the pressure setting section 31 and the measured pressure from the pressure meter 21 to determine a pressure deviation and calculates a correction gas amount based on the pressure deviation; an adder (adding section) 34 that adds the correction gas amount determined by the correction gas amount calculating section 33 to the estimated inflow gas amount determined by the inflow gas amount estimating section 32 to obtain a corrected gas amount and outputs the corrected gas amount as a set discharge gas amount; and a valve opening degree calculating section 35 that calculates a target valve opening degree (hereinafter, will be called a set valve opening degree) of the vacuum valve 4 based on the set discharge gas amount outputted from the adder 34 and the set pressure from the pressure setting section 31.

Figure 6:
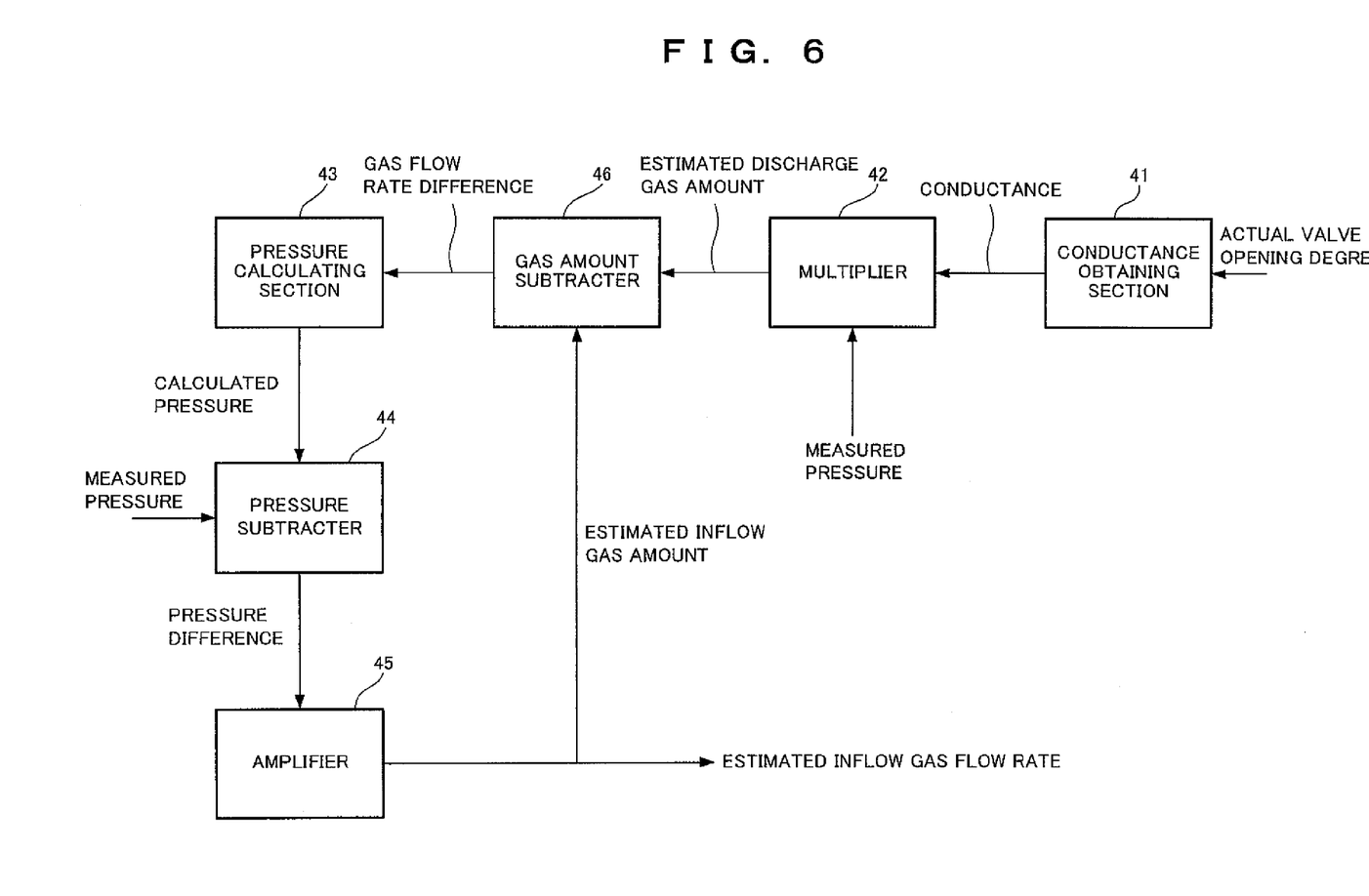
FIG. 6 is a block diagram showing the schematic configuration of an inflow gas amount estimating section in the pressure controller.

As shown in FIG. 6, the inflow gas amount estimating section 32 includes a conductance obtaining section 41 that determines the conductance of the vacuum valve 4 based on the characteristic curve of the vacuum valve 4 from the actual valve opening degree; a multiplier (multiplying section) 42 that receives the conductance obtained by the conductance obtaining section 41 and the measured pressure from the pressure meter 21 and determines the estimated value of a discharge gas flow rate by multiplying the conductance by the measured pressure; a pressure calculating section [to be specific, an integrator having a transfer function of $1/\beta_n s$) on a calculation model wherein $\beta_n$ is the pressure gain (nominal value) of the container] 43 that receives a gas flow rate difference between the estimated discharge gas amount determined by the multiplier 42 and the estimated inflow gas amount (will be specifically described later) to determine a pressure in the imaginary vacuum container by calculation; a pressure subtracter (subtracting section) 44 that receives the calculated pressure determined by the pressure calculating section 43 and the measured pressure from the pressure meter 21 to determine a pressure difference between the calculated pressure and the measured pressure; an amplifier (amplifying section) 45 for obtaining the estimated inflow gas amount by multiplying the pressure difference determined by the pressure subtracter 44 by a predetermined gain ($K_{obs}$); and a gas amount subtracter (subtracting section) 46 that is disposed between the multiplier 42 and the pressure calculating section 43 to determine a gas flow rate difference by subtracting the estimated discharge gas amount from the estimated inflow gas amount determined by the amplifier 45.

The inflow gas amount estimating section 32 has the function of determining the estimated inflow gas amount according to a pressure difference between the actual measured pressure and the calculated pressure determined (a pressure in the container is determined by accumulating gas flow rate differences) in the imaginary vacuum container on the calculation model by integrating a gas flow rate difference obtained by subtracting the estimated discharge gas amount estimated according to the actual valve opening degree from the estimated inflow gas amount obtained by the inflow gas amount estimating section 32. In other words, when the calculated pressure is deviated from the measured pressured, the calculated pressure is corrected according to the pressure difference, that is, a gas flow rate difference is determined such that the calculated pressure comes close to the measured pressure [a calculation loop (an arithmetic loop made up of the gas amount subtracter 46, the pressure calculating section 43, the pressure subtracter 44, and the amplifier 45) is designed such that the calculated pressure follows the measured pressure]. Thus the estimated inflow gas amount determined in a certain calculation loop (a certain period) is used when a gas flow rate difference used for the subsequent calculation loop (subsequent period) is determined. The calculation loop (including the acquisition of the actual valve opening degree) is repeated with a predetermined period (an operation period or a control period of, e.g., 10 msec).

In the explanation, the calculated pressure obtained in the imaginary vacuum container by the inflow gas amount estimating section 32 is determined by integrating the gas flow rate difference obtained by subtraction from the estimated inflow gas amount. To be specific, the calculated pressure determined by the current calculation loop is obtained by adding the current gas flow rate difference as a pressure to the calculated pressure determined in the preceding calculation loop. At the start of the calculation loop, the preceding calculation loop is not present and thus a pressure value measured in the actual vacuum container at the start of the calculation loop is used as an initial value.

As shown in FIG. 6, the calculation loop performs, in each predetermined operation period, the steps of: determining a gas flow rate difference in the gas amount subtracter 46; determining a calculated pressure in the imaginary vacuum container by inputting the gas flow rate difference to the pressure calculating section 43 and integrating the gas flow rate difference therein; determining a pressure difference between the calculated pressure in the imaginary vacuum container and a measured pressure in the actual vacuum container by the pressure subtracter 44; and inputting the pressure difference to the amplifier 45 to determine an estimated inflow gas amount and inputting the estimated inflow gas amount to the gas amount subtracter 46. The estimated inflow gas amount determined in a certain operation period is inputted to determine a gas flow rate difference in the gas amount subtracter 46 in the subsequent operation period. In other words, a gas amount used for determining the calculated pressure in the imaginary vacuum container is a gas flow rate difference obtained by subtracting the estimated discharge gas amount determined for the current operation period from an estimated inflow gas amount determined in the preceding operation period.

Figure 7:
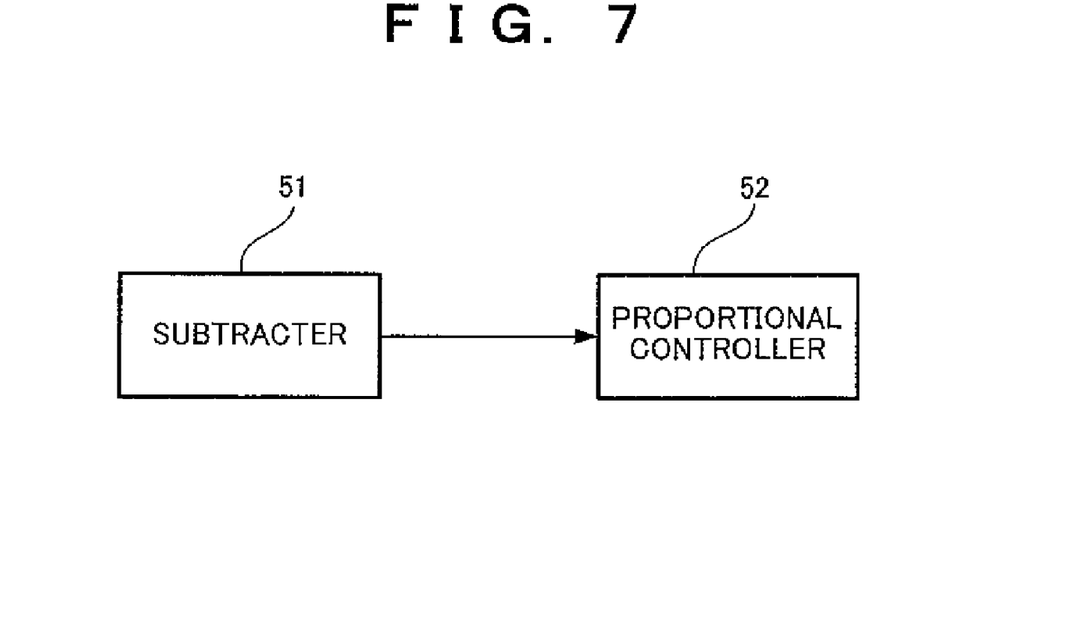
FIG. 7 is a block diagram showing the schematic configuration of a correction gas amount calculating section in the pressure controller.

As shown in FIG. 7, the correction gas amount calculating section 33 is made up of a subtracter (subtracting section) 51 that receives the set pressure from the pressure setting section 31 and the measured pressure from the pressure meter 21 to determine a pressure deviation; and a proportional controller (a proportional control section for multiplying a proportional gain $K_p$) 52 that receives the pressure deviation determined by the subtracter 51 to determine a gas amount proportional to the pressure deviation and outputs the gas amount as a correction gas amount.

Figure 8:
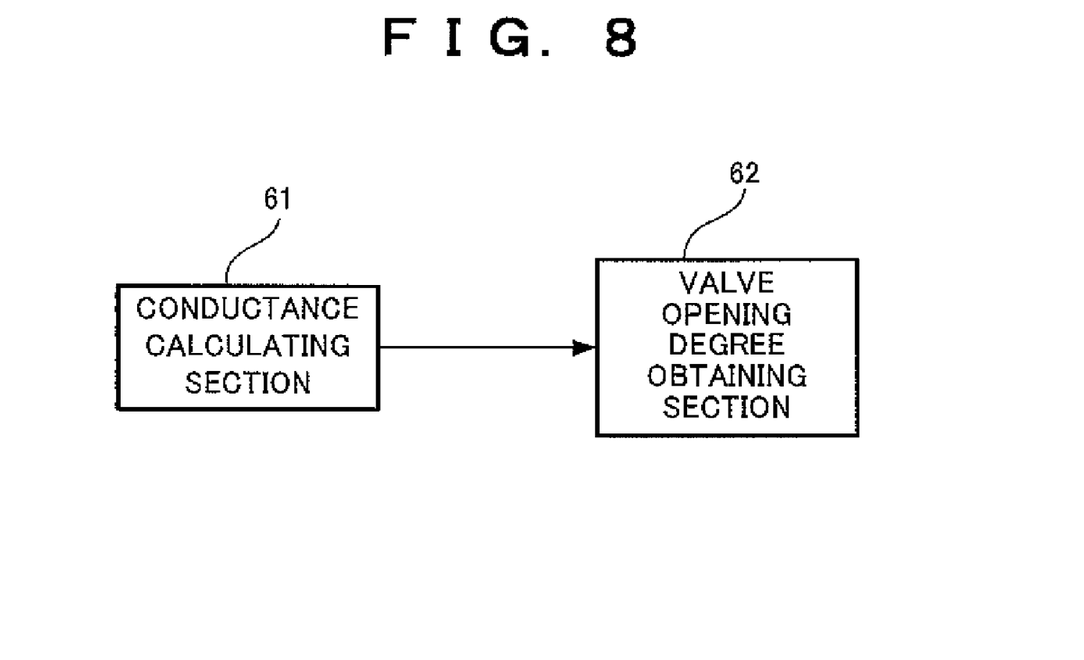
FIG. 8 is a block diagram showing the schematic configuration of a valve opening degree calculating section in the pressure controller.

As shown in FIG. 8, the valve opening degree calculating section 35 is made up of a conductance calculating section 61 that receives the set discharge gas amount outputted from the adder 34 and the set pressure from the pressure setting section 31 to determine a conductance; and a valve opening degree obtaining section 62 that receives the conductance determined by the conductance calculating section 61 and obtains a valve opening degree from the characteristic curve (reversed from the characteristic curve of the conductance obtaining section 41) of the valve.

The pressure controller 9 is made up of a computer device and the functions of the components including the calculating sections are realized by software. For example, the inflow gas amount estimating section 32 is incorporated on the computer device as a calculation model having the same function as the vacuum container.

The following will describe the method for controlling a pressure in the vacuum container.

It is assumed that a pressure in the vacuum container 1 is stabilized at a certain value and another pressure is set in the pressure setting section 31.

In this state, an actual valve opening degree is inputted to the inflow gas amount estimating section 32 from the opening degree detector 22, so that a conductance is obtained by the conductance obtaining section 41 and is multiplied by a measured pressure by the multiplier 42 to obtain an estimated discharge gas amount. Further, in the gas amount subtracter 46, a gas flow rate difference is determined by subtracting the currently determined estimated discharge gas amount from the estimated inflow gas amount obtained in the preceding operation period. The gas flow rate difference is inputted to the pressure calculating section 43 to determine a pressure in the imaginary vacuum container, that is, a calculated pressure on the calculation model.

Next, a pressure difference between the calculated pressure and a measured pressure from the pressure meter 21 is determined and is multiplied by a predetermined gain by the amplifier 45 to obtain another estimated inflow gas amount. The another estimated inflow gas amount is used for determining a gas flow rate difference in the subsequent calculation loop, that is, in the subsequent operation period, so that the calculated pressure is controlled to be close to the measured pressure.

The set pressure in the pressure setting section 31 is inputted to the correction gas amount calculating section 33, a pressure deviation between the set pressure and the measured pressure from the pressure meter 21 is determined in the subtracter 51, and the pressure deviation is inputted to the proportional controller 52 and is multiplied by the proportional gain to obtain a correction gas amount.

Further, the correction gas amount and the another estimated inflow gas amount determined in the inflow gas amount estimating section 32 are inputted to the adder 34 and a set discharge gas amount is obtained.

Next, the set discharge gas amount and the set pressure from the pressure setting section 31 are inputted to the valve opening degree calculating section 35 and a set valve opening degree is determined for obtaining the set discharge gas amount. To be specific, the set discharge gas amount and the set pressure are inputted to the conductance calculating section 61 to obtain a conductance, the conductance is inputted to the valve opening degree obtaining section 62, and a valve opening degree is determined from the characteristic curve of the valve. Moreover, a valve opening degree command is outputted to the driving motor 7 and the valve element 6 is driven to have the predetermined valve opening degree.

These operations are repeatedly performed. The estimated inflow gas amount determined in the inflow gas amount estimating section 32 is regarded as being equal to the actual inflow gas amount when the calculated pressure is equal to the measured pressure or the calculated pressure follows the measured pressure with a certain deviation.

A specific numerical example will be described below.

A set pressure value in the vacuum container 1 and an actual pressure value in the vacuum container 1 are both 90 mT and an inflow gas amount is stabilized at 100 sccm. In this state, when the set pressure is changed from 90 mT to 100 mT, an estimated inflow gas amount remains 100 sccm. At a time when the set pressure value changes from 90 mT to 100 mT, a measured pressure value is 90 mT and a correction gas amount is −10 sccm [=−1(proportional gain)×(100−90)mT]. Thus a set discharge gas amount is 90 sccm, a conductance changes from 1.0 to 0.9(90/100), and the valve element 6 moves in a closing direction to increase a pressure. When the pressure reaches 100 mT, the correction gas amount is 0, the set discharge gas amount is 100 sccm, and the conductance is 1.0, so that the pressure is stabilized.

In the vacuum container, when the same amount of gas as an inflow gas amount is discharged to control a pressure, another estimated inflow gas amount is used as the inflow gas amount corresponding to a pressure difference between a calculated pressure in the imaginary vacuum container and a measured pressure in the actual vacuum container. The calculated pressure is determined on the calculation model by obtaining an estimated discharge gas amount based on an actual valve opening degree, inputting a gas flow rate difference obtained by subtracting the estimated discharge gas amount from an estimated inflow gas amount determined in the inflow gas amount estimating section, and integrating the gas flow rate difference.

In other words, another estimated inflow gas amount is determined according to a pressure difference between the measured pressure in the actual vacuum container and the calculated pressure in the imaginary vacuum container. The calculated pressure is determined based on a gas flow rate difference obtained by subtracting the estimated discharge gas amount obtained based on the opening degree of the vacuum valve from the preceding estimated inflow gas amount. Further, the correction gas amount determined using the pressure deviation of the measured pressure from the set pressure is added to the estimated inflow gas amount to obtain the set discharge gas amount, and the opening degree of the valve is controlled such that the discharge gas amount reaches the set discharge gas amount. Thus only proportional control is necessary in feedback control on a pressure and it is not necessary to adjust resetting conditions in proportional integral control, achieving a simple control structure.

In other words, in feedback control for tracking the set pressure to obtain the set discharge gas amount, PID control or at least PI control is necessary in the prior art, whereas in the present invention, the estimated inflow gas amount is obtained in the inflow gas amount estimating section in response to an integral action (I control) on a pressure deviation and thus only proportional control is necessary in a feedback control system.

For example, in PI control, particularly when an integral action is provided, it is necessary to set resetting conditions (conditions for changing the timing of control according to a deviation). The resetting conditions have to be determined by trial and error. The implementation of the resetting conditions by logic involves quite a troublesome operation (windup). However, the estimated inflow gas amount determined in the inflow gas amount estimating section acts like an integral obtained in the integral action, thereby eliminating the need for the troublesome integral action. As a matter of course, it is not necessary to measure the inflow gas amount to control a pressure in the vacuum container.

The principle part of the pressure control method will be described in steps as follows:

The pressure control method is a pressure control method for controlling a pressure in a vacuum container in a vacuum processing device including: the vacuum container to which a gas supply conduit and a discharge conduit are connected; a vacuum valve provided on the discharge conduit so as to open and close the discharge conduit; a pressure meter for measuring the pressure in the vacuum container; and an opening degree detector for detecting the degree of opening of the vacuum valve, the pressure control method including:

a first step of determining by calculation a pressure in an imaginary vacuum container on a calculation model based on a gas amount obtained in consideration of an estimated discharge gas amount determined based on the degree of opening of the vacuum valve, the degree of opening being detected by the opening degree detector;

a second step of determining an estimated inflow gas amount based on a pressure difference between the calculated pressure determined in the first step and a pressure measured in an actual vacuum container by the pressure meter; and a third step of determining a set discharge gas amount by adding, to the estimated inflow gas amount determined in the second step, a correction gas amount obtained based on a pressure deviation between a target set pressure and the measured pressure, wherein the steps are repeatedly performed in each predetermined period, the degree of opening of the vacuum valve is controlled such that a discharge gas amount reaches the set discharge gas amount determined in the third step, and the gas amount used for determining the calculated pressure in the imaginary vacuum container in the first step is a gas flow rate difference obtained by subtracting the estimated discharge gas amount from the estimated inflow gas amount determined in the second step of the preceding period.

The principle part of the pressure controller will be described below.

The pressure controller is a pressure controller for controlling a pressure in a vacuum container in a vacuum processing device including: the vacuum container to which a gas supply conduit and a discharge conduit are connected; a vacuum valve provided on the discharge conduit so as to open and close the discharge conduit; a pressure meter for measuring the pressure in the vacuum container; and an opening degree detector for detecting the degree of opening of the vacuum valve, the pressure controller including:

a pressure setting section setting the target pressure of the vacuum container;

an inflow gas amount estimating section that determines a pressure in an imaginary vacuum container on a calculation model based on a gas amount obtained in consideration of an estimated discharge gas amount determined according to the degree of opening detected by the opening degree detector, and determines an estimated inflow gas amount based on a pressure difference between the calculated pressure in the imaginary vacuum container and a pressure measured in an actual vacuum container by the pressure meter;

a gas amount correcting section having a pressure subtracting section that receives the set pressure from the pressure setting section and the measured pressure from the pressure meter to determine a pressure deviation, and a proportional control section that receives the pressure deviation determined in the pressure subtracting section and multiplies the pressure deviation by a predetermined gain to obtain a correction gas amount;

an adding section that adds the estimated inflow gas amount determined in the inflow gas amount estimating section and the correction gas amount determined in the gas amount correcting section to determine a set discharge gas amount; and a valve opening degree calculating section that receives the set discharge gas amount obtained in the adding section and the set pressure from the pressure setting section to determine a valve opening degree, wherein in the inflow gas amount estimating section, the pressure in the imaginary vacuum container on the calculation model is determined based on the gas amount and an operation for determining the estimated inflow gas amount is performed in each predetermined period based on the pressure difference between the calculated pressure in the imaginary vacuum container and the pressure measured in the actual vacuum container by the pressure meter, in the inflow gas amount estimating section, the gas amount used for determining the calculated pressure in the imaginary vacuum container is a gas flow rate difference obtained by subtracting the estimated discharge gas amount from the estimated inflow gas amount determined in the preceding operation period, and the inflow gas amount estimating section includes:

a conductance obtaining section that determines the conductance of the vacuum valve from the detected degree of opening and based on the valve opening degree-conductance characteristic curve of the vacuum valve;

a multiplying section that receives the conductance obtained in the conductance obtaining section and the measured pressure from the pressure meter and multiplies the conductance by the measured pressure to obtain the estimated discharge gas amount;

a gas amount subtracting section that subtracts the estimated discharge gas amount determined in the multiplying section from the estimated inflow gas amount determined in the preceding operation period to obtain the gas flow rate difference;

a pressure calculating section that receives the gas flow rate difference determined in the gas amount subtracting section and determines the pressure in the imaginary vacuum container by calculation;

a pressure subtracting section that receives the calculated pressure determined in the pressure calculating section and the measured pressure from the pressure meter to determine the pressure difference; and an amplifying section that multiplies the pressure difference determined in the pressure subtracting section by the predetermined gain to determine the estimated inflow gas amount.

Figure 9:
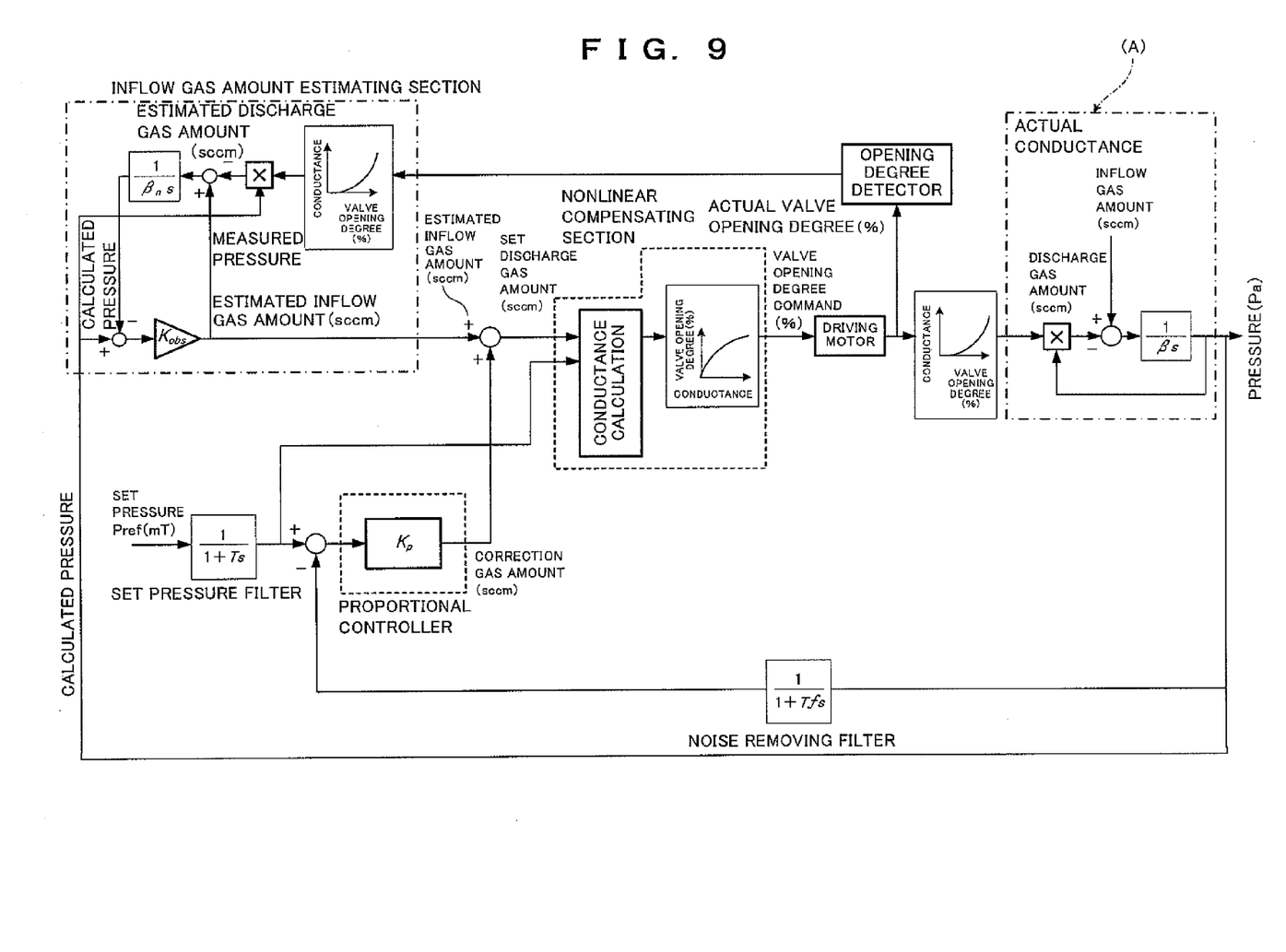
FIG. 9 is a control block diagram showing the schematic configuration of the pressure controller.

FIG. 9 is a control block diagram (using a transfer function) showing the pressure control system.

In FIG. 9, (A) represents the vacuum container. As shown in FIG. 9, a set pressure filter and a noise removing filter are provided in the output path of the set pressure and the measured pressure to the correction gas amount calculating section, though the filters were not described in the embodiment.

Figure 10:
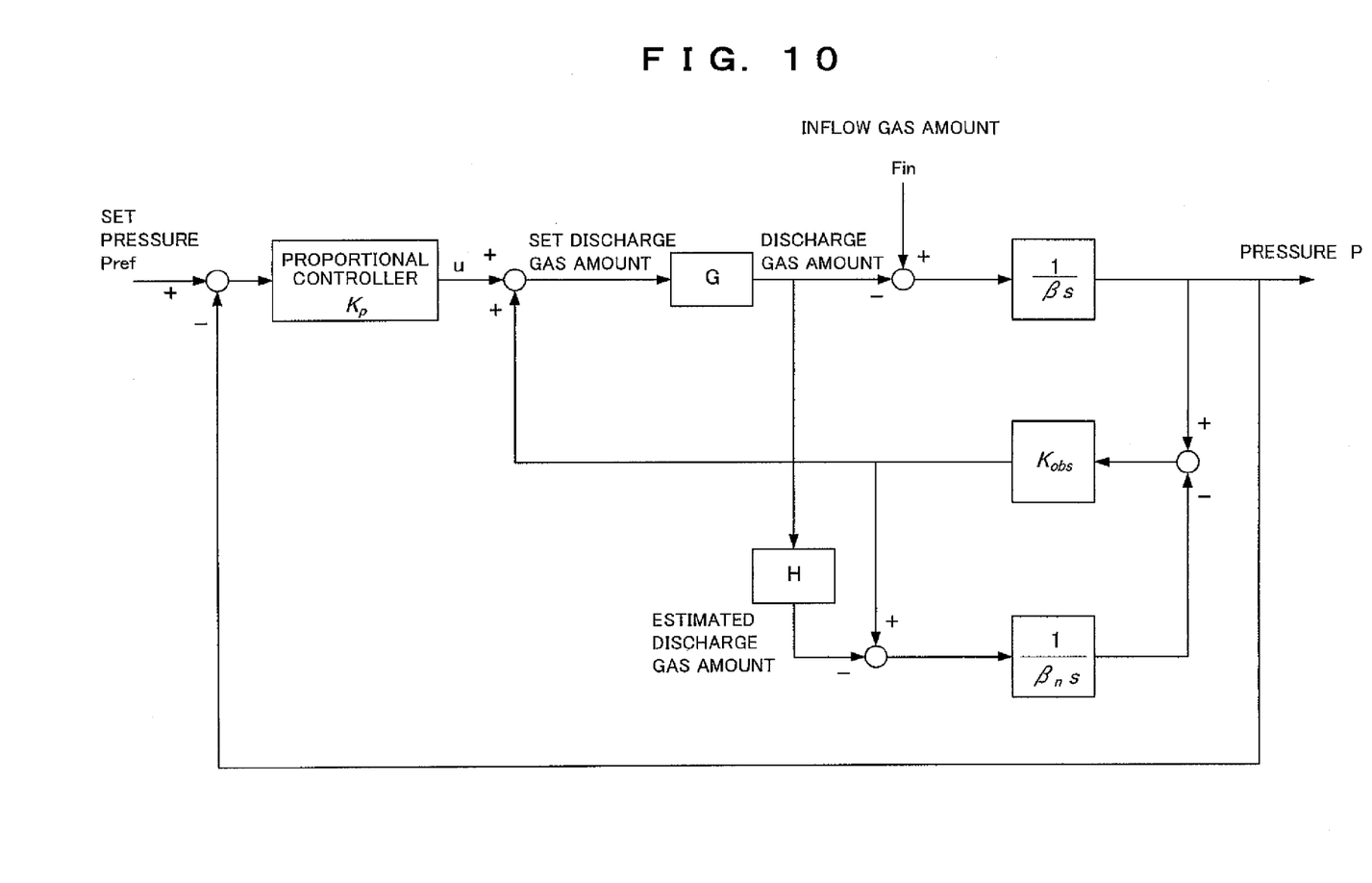
FIG. 10 is a control block diagram showing the main configuration of the pressure controller.

Referring to FIG. 10, the following will particularly describe pressure response (by the transfer function) between the inflow gas amount estimating section and the proportional controller of the feedback control system in the pressure control system. FIG. 10 is a control block diagram of the inflow gas amount estimating section 32 and the correction gas amount calculating section 33.

In an actual control system, a conductance is determined according to a set discharge gas amount and a set pressure, a valve opening degree is determined from a characteristic curve, and gas is discharged to the valve opening degree. In FIG. 10, the transfer function of a set discharge gas amount and a discharge gas amount of this part is represented as G (a nonlinear function indicating the relationship between a set value and an actual flow rate of a discharge gas amount). Further, a characteristic curve indicating the relationship between a measured valve opening degree and a conductance is stored as, for example, a table, the current conductance is estimated from the current valve opening degree, and the conductance is multiplied by a pressure, so that a used discharge gas amount is estimated. H represents the transfer function of an actual discharge gas amount and an estimated discharge gas amount.

The transfer function of an open loop from an output u to a pressure P of the proportional controller is expressed by equation (1) below:

[Expression 1]

$$P = \frac{-G\left(1 + \frac{\beta_n}{K_{obs}}s\right)u - \left((GH-1) - \frac{\beta_n}{K_{obs}}s\right)Fin}{\beta_n s\left(\frac{\beta}{K_{obs}}s + 1\right)} \quad (1)$$

In equation (1), when G=H=1 and $\beta/(K_{obs}) \approx 0$ are set (that is, when the value of $K_{obs}$ increases), the relationship of equation (2) is established as follows:

[Expression 2]

$$P = \frac{-\left(1 + \frac{\beta_n}{K_{obs}}s\right)u}{\beta_n s} + \frac{\frac{\beta_n}{K_{obs}}sFin}{\beta_n s}$$

$$= \frac{-u}{\beta_n s \frac{1}{1+Ts}} + \frac{\left(1 - \frac{1}{1+Ts}\right)Fin}{\beta_n s \frac{1}{1+Ts}} \quad (2)$$

In equation (2), $T = \beta_n(K_{obs})$ is established.

Thus it is understood that a pressure change relative to the set discharge gas amount and the actual discharge gas amount is determined by a nominal value $\beta_n$ and the influence of an actual pressure time constant $\beta$ is negligible. In other words, behaviors are exhibited as if the imaginary vacuum container were connected.

In a region at or lower than the cut-off frequency of a transfer function (1/(1+Ts)) included in equation (2), the transfer function of a set pressure (Pref), a gas flow rate (Fin), and the pressure P is expressed by equation (3) below:

[Expression 3]

$$P = \frac{1}{1 - \frac{\beta_n}{K_p}s} P_{ref} - \left(1 - \frac{1}{1+Ts}\right)\left(1 - \frac{1}{1 - \frac{\beta_n}{K_p}s}\right)\frac{Fin}{\beta_n s} \quad (3)$$

Based on equation (3), time response is determined (by inverse Laplace transform) as follows:
a; (Pref=1/s, Fin=0) when the set pressure value is changed in steps.

[Expression 4]

$$P = \left(1 - e^{\frac{K_p}{\beta_n}t}\right) \quad (4)$$

Equation (4) proves that the control system of the present invention has a stationary error (t→∞) of 0 relative to the set pressure value changing in steps and the control system does not cause overshoot. Assuming that $\beta_n$ is adjusted substantially to the pressure gain of the actual vacuum container, the pressure response characteristic can be adjusted by changing $K_p$.
b; (Fin=1/s, Pref=0) when a gas flow rate value is changed in steps.

By substituting Fin=1/s and Pref=0 into equation (3) and arranging equation (3), equation (5) is obtained as follows:

[Expression 5]

$$P = \frac{1}{(1+Ts)(1+T_m s)} \times \frac{1}{\beta_n} \quad (5)$$

where, $T_m = \frac{\beta_n}{K_p}$

By ignoring a higher-order (quadratic) term in equation (5), equation (6) is obtained as follows:

[Expression 6]

$$P = \frac{TT_m}{1+(T+T_m)s} \times \frac{1}{\beta_n} \quad (6)$$

By transforming equation (6) to a time function, equation (7) is obtained as follows:

[Expression 7]

$$P = \frac{1}{-K_p + K_{obs}} e^{\frac{-K_p + K_{obs}}{\beta_n}t} \quad (7)$$

Equation (7) proves that the control system of the present invention has a stationary error (t→∞) of 0 relative to a gas flow rate value changing in steps. Assuming that $\beta_n$ is adjusted substantially to the pressure gain of the actual vacuum container, $K_p$ is determined by adjusting the pressure response characteristic, so that a disturbance suppression characteristic can be adjusted by changing $K_{obs}$.

In the pressure control system, the inflow gas amount estimating section obtains, as an estimated inflow gas amount, a change of an inflow gas amount in the vacuum chamber as well as an amount of reactant gas generated by plasma in the vacuum chamber, and a command is issued to discharge the inflow gas flow rate, thereby suppressing fluctuations in pressure relative to fluctuations in gas flow rate (disturbance suppression characteristic). On the other hand, a pressure is caused to follow a change of the pressure set value by specifying a correction gas amount relative to the estimated inflow gas amount by proportional control on a deviation between the pressure set value and a pressure value. In other words, it is possible to independently adjust the pressure response characteristic relative to the pressure set value and a suppression characteristic relative to a change of a gas flow rate, that is, the disturbance suppression characteristic.

To put it simply, it is generally known that a pressure tracking characteristic relative to a pressure set value and the suppression characteristic relative to a change of the gas flow rate cannot be simultaneously optimized only by PI control (or PID control). The present embodiment can solve this problem.

In the present embodiment, the calculation loop was described as the steps of: determining a gas flow rate difference in the gas amount subtracter; determining a calculated pressure in the imaginary vacuum container by adding, in the pressure calculating section, a pressure corresponding to the gas flow rate difference to a calculated pressure determined in the preceding calculation loop; determining a pressure difference by subtracting a measured pressure in the actual vacuum container from the calculated pressure in the pressure subtracter; and then determining an estimated inflow gas amount from the pressure difference by the amplifier (in other words, the calculation loop is started from "determining a gas flow rate difference in a gas subtracter"). In reality, the calculation loop is started from "determining a pressure difference by subtracting the measured pressure in the actual vacuum container from the calculated pressure in the pressure subtracter".

The two steps are itemized as follows:
(1) The Steps Described in the Present Embodiment
First Time
An initial pressure value in the imaginary vacuum container→$P_0$
A measured pressure value in the actual vacuum container→$P_{k1}$
a. The gas amount subtracter→no operations for the first time
b. The pressure calculating section→$P_0+G_1\times(1/\beta_n)\times\Delta t=P_1$
$G_1$: a gas flow rate difference ($G_1$=0: a pressure is not added based on the gas flow rate difference)
$\Delta t$: a control period
c. The pressure subtracter→$P_1-P_{k1}=\Delta P_1$
d. The amplifier→an estimated inflow gas rate $F_1$ is determined by multiplying $\Delta P_1$ by a gain
Second Time
A pressure value in the imaginary container is P1 at the entrance of the second calculation loop.
A measured pressure value in the actual vacuum container→$P_{k2}$
a. The gas amount subtracter→the estimated inflow gas flow rate $F_1$—an estimated discharge gas flow rate $H_2=G_2$
b. The pressure calculating section→$P_1+G_2\times(1/\beta_n)\times\Delta t=P_2$
c. The pressure subtracter→$P_2-P_{k2}=\Delta P_2$
d. The amplifier→an estimated inflow gas flow rate $F_2$ is determined by multiplying $\Delta P_2$ by a gain
Third Time (Also from the Fourth Time)
A pressure value in the imaginary vacuum container is $P_2$ at the entrance of the third calculation loop.
A measured pressure value in the actual vacuum container→$P_{k3}$
a. The gas amount subtracter→the estimated inflow gas flow rate $F_2$-an estimated discharge gas flow rate $H_3=G_3$
b. The pressure calculating section→$P_2+G_3\times(1/\beta_n)\times\Delta t=P_3$
c. The pressure subtracter→$P_3-P_{k3}=\Delta P_3$
d. The amplifier→an estimated inflow gas flow rate $F_3$ is determined by multiplying $\Delta P_3$ by a gain (2) Actual Steps First Time An initial pressure value in the imaginary vacuum container→$P_1$ A measured pressure value in the actual vacuum container→$P_{k1}$ a. The pressure subtracter→$P_1-P_{k1}=\Delta P_1$
b. The amplifier→an estimated inflow gas flow rate $F_1$ is determined by multiplying $\Delta P_1$ by a gain
c. The gas amount subtracter→the estimated inflow gas flow rate $F_1$—an estimated discharge gas flow rate $H_1=G_1$
d. The pressure calculating section→$P_1+G_1\times(1/\beta_n)\times\Delta t=P_2$ $P_2$ is stored in memory and is used for the second calculation.

Second Time

A pressure value in the imaginary vacuum container is $P_2$ at the entrance of the second calculation loop.

A measured pressure value in the actual vacuum container→$P_{k2}$ a. The pressure subtracter→$P_2-P_{k2}=\Delta P_2$
b. The amplifier→an estimated inflow gas flow rate $F_2$ is determined by multiplying $\Delta P_2$ by a gain
c. The gas amount subtracter→the estimated inflow gas flow rate $F_2$—an estimated discharge gas flow rate $H_2=G_2$
d. The pressure calculating section→$P_2+G_2\times(1/\beta_n)\times\Delta t=P_3$ Third Time (Also from the Fourth Time)

A pressure value in the imaginary vacuum container is $P_3$ at the entrance of the third calculation loop.

A measured pressure value in the actual vacuum container→$P_{k3}$ a. The pressure subtracter→$P_3-P_{k3}=\Delta P_3$
b. The amplifier→an estimated inflow gas flow rate $F_3$ is determined by multiplying $\Delta P_3$ by a gain
c. The gas amount subtracter→the estimated inflow gas flow rate $F_3$—an estimated discharge gas flow rate $H_3=G_3$
d. The pressure calculating section→$P_3+G_3\times(1/\beta_n)\times\Delta t=P_4$ In other words, the present invention can be more understood in the steps of (1). Actually, the calculation loop is started from the step of subtracting a pressure as described in (2).

The claims are also described in accordance with the steps of (1). Since the calculation is performed in a loop, the claims naturally include the steps of (2).

The invention claimed is:

1. A pressure controller for controlling a pressure in a vacuum container in a vacuum processing device comprising: the vacuum container to which a gas supply conduit and a discharge conduit are connected; a vacuum valve provided on the discharge conduit so as to open and close the discharge conduit; a pressure meter for measuring the pressure in the vacuum container; and an opening degree detector for detecting a degree of opening of the vacuum valve, the pressure controller comprising:

a pressure setting section for setting a target pressure of the vacuum container;

an inflow gas amount estimating section that determines a calculated pressure in an imaginary vacuum container using a calculation model and based on a gas amount obtained in consideration of an estimated discharge gas amount determined according to the degree of opening detected by the opening degree detector, and determines an estimated inflow gas amount based on a pressure difference between the calculated pressure in the imaginary vacuum container and a pressure measured in an actual vacuum container by the pressure meter;

a gas amount correcting section having a pressure subtracting section that receives the set pressure from the pressure setting section and the measured pressure from the pressure meter to determine a pressure deviation, and a proportional control section that receives the pressure deviation determined in the pressure subtracting section and multiplies the pressure deviation by a predetermined gain to obtain a correction gas amount;

an adding section that adds the estimated inflow gas amount determined in the inflow gas amount estimating section and the correction gas amount determined in the gas amount correcting section to determine a set discharge gas amount; and a valve opening degree calculating section that receives the set discharge gas amount obtained in the adding section and the set pressure from the pressure setting section to determine a valve opening degree, wherein in the inflow gas amount estimating section, the calculated pressure in the imaginary vacuum container is determined using the calculation model and is based on the gas amount, and an operation for determining the estimated inflow gas amount is performed in each predetermined period based on the pressure difference between the calculated pressure in the imaginary vacuum container and the pressure measured in the actual vacuum container by the pressure meter, and in the inflow gas amount estimating section, the gas amount used for determining the calculated pressure in the imaginary vacuum container is a gas flow rate difference obtained by subtracting the estimated discharge gas amount from the estimated inflow gas amount.

2. The pressure controller of the vacuum container according to claim 1, wherein the inflow gas amount estimating section comprises:

a conductance obtaining section that determines a conductance of the vacuum valve from the detected degree of opening and based on a valve opening degree-conductance characteristic curve of the vacuum valve;

a multiplying section that receives the conductance obtained in the conductance obtaining section and the measured pressure from the pressure meter and multiplies the conductance by the measured pressure to obtain the estimated discharge gas amount;

a gas amount subtracting section that subtracts the estimated discharge gas amount determined in the multiplying section from the estimated inflow gas amount to obtain the gas flow rate difference;

a pressure calculating section that receives the gas flow rate difference determined in the gas amount subtracting section and determines the calculated pressure in the imaginary vacuum container by calculation;

a pressure subtracting section that receives the calculated pressure determined in the pressure calculating section and the measured pressure from the pressure meter to determine the pressure difference; and an amplifying section that multiplies the pressure difference determined in the pressure subtracting section by the predetermined gain to determine the estimated inflow gas amount.

* * * * *